(12) United States Patent
Muallem (10) Patent No.: US 11,809,186 B2
(45) Date of Patent: Nov. 7, 2023

(54) ROBOTIC BIOCIDE DISPENSER AND CLEANER

(71) Applicant: Danny Muallem, Canoga Park, CA (US)

(72) Inventor: Danny Muallem, Canoga Park, CA (US)

( * ) Notice: Subject to any disclaimer, the term of this patent is extended or adjusted under 35 U.S.C. 154(b) by 635 days.

(21) Appl. No.: 16/794,595

(22) Filed: Feb. 19, 2020

(65) Prior Publication Data

US 2021/0255624 A1 Aug. 19, 2021

(51) Int. Cl.
| | |
|---|---|
| *G05D 1/00* | (2006.01) |
| *G05D 1/02* | (2020.01) |
| *A01M 9/00* | (2006.01) |
| *A01M 7/00* | (2006.01) |
| *A47L 7/00* | (2006.01) |
| *A47L 9/00* | (2006.01) |

(Continued)

(52) U.S. Cl.
CPC ......... *G05D 1/0094* (2013.01); *A01M 7/0032* (2013.01); *A01M 7/0089* (2013.01); *A01M 9/0007* (2013.01); *A01M 9/0092* (2013.01); *A47L 7/0085* (2013.01); *A47L 9/009* (2013.01); *A47L 9/2826* (2013.01); *A47L 9/2852* (2013.01); *A47L 9/2894* (2013.01); *G05D 1/0088* (2013.01); *G05D 1/0225* (2013.01); *G05D 1/0274* (2013.01); *A01M 2200/011* (2013.01); *A47L 2201/022* (2013.01); *A47L 2201/04* (2013.01); *B60L 53/14* (2019.02); *G05D 2201/0215* (2013.01)

(58) Field of Classification Search
CPC .. G05D 1/0094; G05D 1/0088; G05D 1/0225; G05D 1/0274; G05D 2201/0215; A01M 7/0032; A01M 7/0089; A01M 9/0007; A01M 9/0092; A01M 2200/011; A47L 7/0085; A47L 9/009; A47L 9/2826; A47L 9/2852; A47L 9/2894; A47L 2201/022; A47L 2201/04; A47L 7/0061; A47L 7/009; A47L 9/0411; A47L 9/2805; A47L 9/2847; A47L 11/4011; A47L 11/4061; B60L 53/14; B60L 1/003; Y02T 10/70; Y02T 10/7072; Y02T 90/14; Y02T 90/16; A61L 2202/15

See application file for complete search history.

(56) References Cited

U.S. PATENT DOCUMENTS 5,465,456 A * 11/1995 Fellhauer .............. A47L 11/302
  15/50.1
5,465,525 A * 11/1995 Mifune .................... B25J 5/005
  43/132.1

(Continued)

*Primary Examiner* — Bhavesh V Amin
(74) *Attorney, Agent, or Firm* — Barry Choobin; Patent 360

(57) ABSTRACT

The present invention is directed to a compact robotic device for spraying a biocide powder or liquid to a predetermined area for controlling the infestation by cockroaches and fleas. The compact robotic device comprises a robotic body that can autonomously travel to spray the powder or liquid. The compact robotic device comprises a cartridge containing the biocide powder, a spray head in fluid communication with the cartridge and configured to spray the powder or liquid over a surface and a pump coupled to the cartridge for affecting the flow of powder or liquid from the cartridge to the spray head.

19 Claims, 13 Drawing Sheets

(51) Int. Cl.
*A47L 9/28* (2006.01)
*B60L 53/14* (2019.01)

(56) References Cited

U.S. PATENT DOCUMENTS

| | | | | |
|---|---|---|---|---|
| 5,815,880 A * | 10/1998 | Nakanishi | A47L 11/4044 | 15/340.1 |
| 5,823,390 A * | 10/1998 | Muderlak | A47K 5/1217 | 222/642 |
| 6,338,013 B1 * | 1/2002 | Ruffner | B60L 3/106 | 180/443 |
| 6,378,784 B1 * | 4/2002 | Allen | B05C 5/027 | 239/296 |
| 6,459,955 B1 * | 10/2002 | Bartsch | G05D 1/0253 | 318/587 |
| 6,611,738 B2 * | 8/2003 | Ruffner | A01D 34/008 | 342/357.66 |
| 7,441,367 B2 * | 10/2008 | Squire | A01M 5/06 | 43/132.1 |
| 8,812,156 B2 * | 8/2014 | Lee | A01M 29/06 | 901/1 |
| 9,943,206 B2 * | 4/2018 | Yang | G05D 1/0022 | |
| 11,348,269 B1 * | 5/2022 | Ebrahimi Afrouzi | G01S 7/4804 | |
| 2002/0153855 A1 * | 10/2002 | Song | G05D 1/0246 | 318/568.12 |
| 2003/0229421 A1 * | 12/2003 | Chmura | A47L 9/0411 | 700/258 |
| 2005/0268425 A1 * | 12/2005 | Clemons | E01H 1/103 | 15/340.1 |
| 2006/0150361 A1 * | 7/2006 | Aldred | B60L 9/00 | 15/340.1 |
| 2006/0204531 A1 * | 9/2006 | Squire | A01M 5/06 | 706/14 |
| 2006/0261188 A1 * | 11/2006 | Ito | A01M 1/2044 | 43/132.1 |
| 2007/0016328 A1 * | 1/2007 | Ziegler | A47L 9/009 | 701/23 |
| 2016/0145884 A1 * | 5/2016 | Erlich | E04H 4/1654 | 15/1.7 |
| 2016/0206768 A1 * | 7/2016 | Mullins | A01N 59/12 | |
| 2017/0231213 A1 * | 8/2017 | Gordon | A01M 25/00 | 43/132.1 |
| 2017/0361468 A1 * | 12/2017 | Cheuvront | G06F 3/01 | |
| 2018/0035606 A1 * | 2/2018 | Burdoucci | H04N 5/232935 | |
| 2021/0255624 A1 * | 8/2021 | Muallem | A47L 11/4061 | |

\* cited by examiner

ROBOTIC BIOCIDE DISPENSER AND CLEANER

CROSS-REFERENCE TO RELATED APPLICATIONS

This application claims priority to the U.S. provisional patent application Ser. No. 62/782,043 filed Dec. 19, 2018 which is incorporated herein by reference in its entirety.

FIELD OF INVENTION

The present invention relates to a compact robotic device, and in more particularly, relates to a robotic cleaner and biocide dispenser for controlling an infestation.

BACKGROUND

Insects and other pests have long plagued humanity. These pose a significant health risk for both domestic animals and humans. Domestic animals such as dogs and cats are more prone to infestation by pests. The term pest hereinafter includes cockroaches, fleas, ticks and bedbugs and like. Fleas are tiny, reddish-brown external parasites that feed off of the blood of domestic animals and can also feed on the blood of the humans. Fleas have armored bodies that make them almost impossible to crush, allowing them to thrive in the carpet undetected. Fleas can be carried over domestic animal's fur and can be easily transferred from the fur to a carpet. Bites by fleas produce significant itching and redness. Moreover, infestation by fleas can cause a severe allergic reaction called anaphylaxis.

Cockroaches are nocturnal insects that thrive in humid and dark places. Cockroaches infestation possess serious health risk to both animals and humans. Wherever cockroaches go, they leave behind traces of their existence including feces, saliva, and parts of their bodies that they shed or that fall off. These parts of cockroaches can cause allergic reactions. Moreover, cockroaches carry some serious pathogens such as *Salmonella typhi*, which causes Typhoid and Poliomyelitis, which causes Polio. They can also cause dysentery, a disease that causes severe diarrhea.

Different compositions of biocides are commercially available to control infestations by the above pests. These compositions may have a narrow spectrum of activity targeting a specific pest, for example, the composition may selectively target cockroaches. Also, broad-spectrum biocides are commercially available that can target more than one pest. Formulations in liquid and powder forms containing one or more of such composition for treating one or more types of pests are commercially available. For example, biocide in the form of powders can be sprinkled over carpet for getting rid of the infestation.

Manually applying a biocide to a surface is both laborious and possesses serious health risks. For example, while applying powder biocide to a surface, some portion of the powder may get suspended in the air and get inhaled. Inhalation of biocide powder can cause allergic reactions and other harmful effects, such as dizziness, toxicity, etc. Thus, a need is appreciated for a device that can autonomously apply biocide to carpets and similar surface.

SUMMARY OF THE INVENTION

The principal objective of the present invention is therefore directed to a compact robotic device for spraying powder or liquid over a carpet and similar surface.

An additional objective of the present invention is that the compact robotic device can also vacuum clean the carpet.

A further objective of the present invention is that the compact robotic device can be programmed to autonomously spray the powder or liquid.

Still an addition object of the present invention is that the compact robotic device can be controlled through a smart phone.

Another object of the present invention is that the compact robotic device can detect and avoid any obstacle in its path.

These and other objects and advantages of the embodiments herein will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
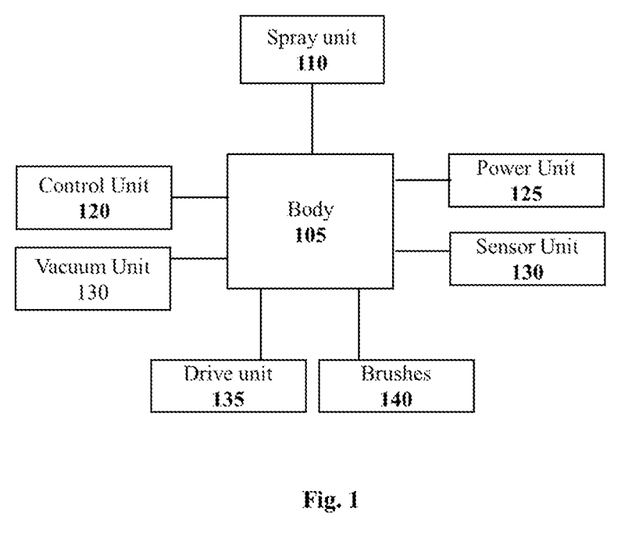
FIG. 1 is a block diagram showing different components of a compact robotic device, in accordance with an embodiment of the present invention.
Figure 3:
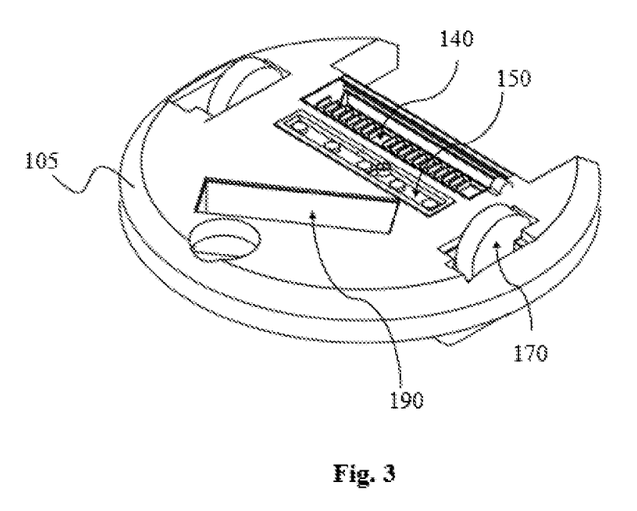
FIG. 3 is a perspective view of a base of the compact robotic device, in accordance with an embodiment of the present invention.
Figure 9:
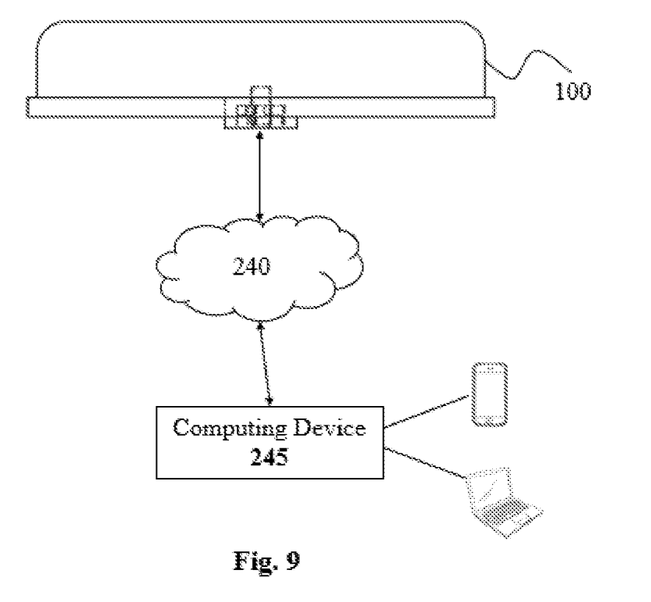
FIG. 9 is a block diagram showing the compact robotic device in communication with a computing device through a network, in accordance with an embodiment of the present invention.

The present invention is directed to a novel robotic device for spraying powder or liquid to a surface. Shown in FIG. 1 is a block diagram of the compact robotic device 100. The compact robotic device 100 comprises a body 105 of the device. The body 105 houses different components of the compact robotic device 100. The body can be made of strong plastic material or lightweight metal such as Aluminum. The body generally can have a top portion/cover mounted on a base. The top portion and the base can have multiple slots for wheels, charging docks, nozzles, etc. The body 105 can be of round, rectangular or square shape. The robotic device 100 shown in FIG. 9 is round shape and having a round base, the round base is shown in FIG. 3. The body houses different components of the compact robotic device 100.

A spray unit 110 in enclosed in the housing. The spray unit functions to spray a biocide powder over an area to be treated. For example, the carpet can be treated with the biocide powder wherein the powder is sprayed by the compact robotic device 100 over the carpet for controlling the infestation. FIG. 1 further shows a drive unit 135 housed in the body 105. The drive unit 135 propels the compact robotic device 100 over the surface for spraying the powder and vacuum cleaning the surface. The sensor unit 130 comprises multiple sensors disposed in and around the body 105. The sensors act as an eye of the compact robotic device 100 and help it to navigate and perform its one or more functions. The control unit 120 is housed in the body 105 and controls the different components of the compact robotic device 100. The vacuum unit 130 is housed in the body 105 and functions to clean the surface by sucking the dirt.

Figure 2:
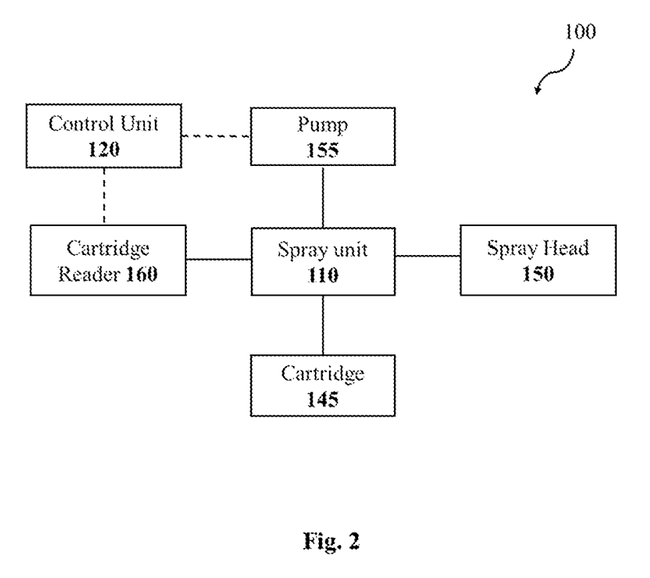
FIG. 2 is a block diagram showing different components of a spray unit, in accordance with an embodiment of the present invention.

FIG. 2 shows the spray unit 110 having a cartridge 145, cartridge reader 160, pump 155, and a spray head 150. The cartridge reader 160 and the pump 155 are shown connected with the control unit 120. The cartridge 145 contains the biocide powder for controlling infestation by the pests. The body 105 is configured with a platform to which cartridge 145 can dock. A prefilled cartridge 145 can be docked over the platform, wherein the cartridge reader 160 detects the presence of the cartridge 145. The cartridge reader 160 can further detect the amount of powder contained or left in the cartridge 145 and communicates the same to the control unit 120. The biocide powder can be made of a composition to treat one or more kinds of infestation, for example cockroaches and fleas. The cartridge 145 is in fluid communication with the spray head 150. An embodiment of the spray head 150 is shown in FIG. 3. The spray head 150 comprises a plurality of nozzles for spraying the powder to a surface. The nozzles face the surface on which the robot 100 is traveling, for example, the nozzle faces the floor or carpet for spraying the powder over the carpet. The pump 155 is coupled to the cartridge and functions to draw the powder from the cartridge 145 into the spray head 150. The pump can be of a type of vibratory pump which can be controlled by the control unit 120 to increase or decrease the speed of the powder flow into the spray head 150. The control unit 120 can be programmed to set the area to be treated for infestation. For example, an area of the carpet can be set into the controlling device by a user for spraying the powder over the carpet.

In an alternate embodiment, the spray unit can spray a biocide liquid over an area to be treated. For example, the carpet can be treated with the biocide liquid wherein the liquid can be sprayed by the compact robotic device 100 over the carpet for controlling the infestation. The cartridge 145 can be configured to contain the biocide liquid for controlling infestation by the pests. Thus, instead of powder, the spray unit can also be configured to spray a biocide liquid. The spray head 150 can be configured to spray a liquid. The pump 155 can be coupled to the cartridge and functions to draw the liquid from the cartridge 145 into the spray head 150. The pump can be of a liquid pump which can be controlled by the control unit 120 to increase or decrease the speed of the spray.

Still in an alternate embodiment, the robotic device 100 can be configured to include both the powder and liquid spray mechanism. There can be two spray units enclosed in the body of the robotic device, wherein the one spray unit is for powder, while the other spray unit can be configured for liquid spray. Each spray unit having the cartridge for the biocide liquid and powder. The pumps suitable for liquid and powder can be included to affect the spray of powder or liquid. Similarly, the nozzle head can be configured with nozzles for both the power and liquid. Thus, it is within the scope of the present invention to provide a robotic device for spraying powder only, a robotic device for spraying liquid only, and a robotic device for spraying both powder and liquid. Furthermore, the robotic device can include a vaporizing unit for providing fragrance, virucide solution and other essential oils.

Figure 4:
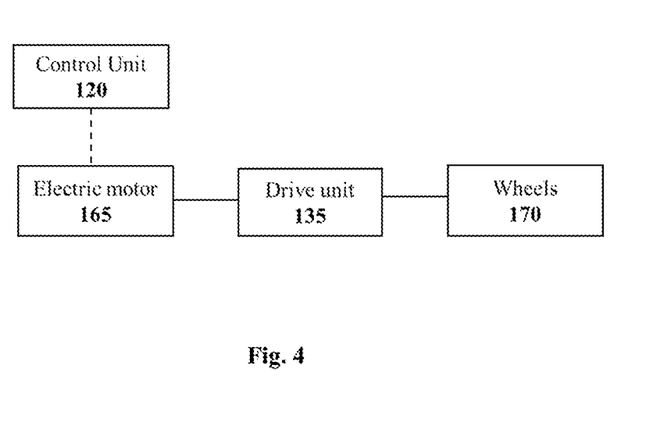
FIG. 4 is a block diagram showing different components of a drive unit, in accordance with an embodiment of the present invention.

FIG. 4 shows an embodiment of the drive unit 135 having one or more electric motors 165 and wheels 170. The electric motor 165 is shown connected with the control unit 120 for controlling the operation and speed of the electric motor 165 and in turn the movement of the compact robotic device 100. The electric motor 165 can be a left electric motor coupled to the left wheel and a right electric motor coupled to the right wheel. The electric motor may also allow for steering of the compact robotic device 100.

Figure 5:
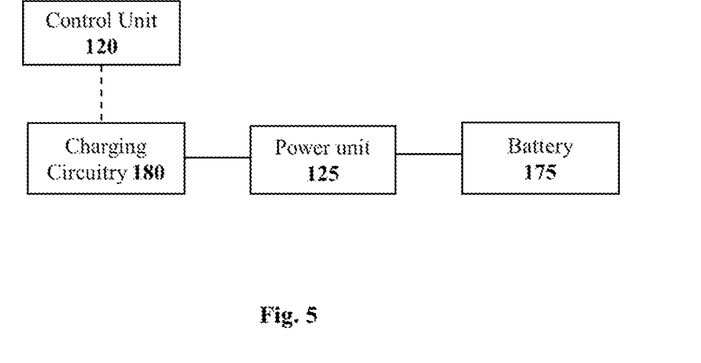
FIG. 5 is a block diagram showing different components of a power unit, in accordance with an embodiment of the present invention.

FIG. 5 shows an embodiment of the power unit 125 having a battery pack 175 and a charging circuitry 180. The charging circuitry 180 is shown connected with the control unit 120 for detecting and controlling the charging of the battery 175. The compact robotic device 100 is powered by the battery 175 enclosed in the body 105. The battery 175 can be portable and rechargeable lithium ion battery. Also, a suitable charging dock can be provided for charging of the battery 175. In one embodiment, the compact robotic device 100 can be programmed to autonomously charge itself. For example, a battery charge sensor can be coupled with the battery. The battery charge sensor detects the amount of charging left in the battery. When the charge drops to a predetermined threshold, the battery charge sensor informs the same to the control unit which triggers the robotic device to autonomously travel to the charging dock for recharging of the battery. On reaching the charging dock, the compact robotic device 100 can dock itself to the charging dock for charging of the battery. Once the battery is charged, the compact robotic device 100 travels back, and then pick up where it left off.

Figure 6:
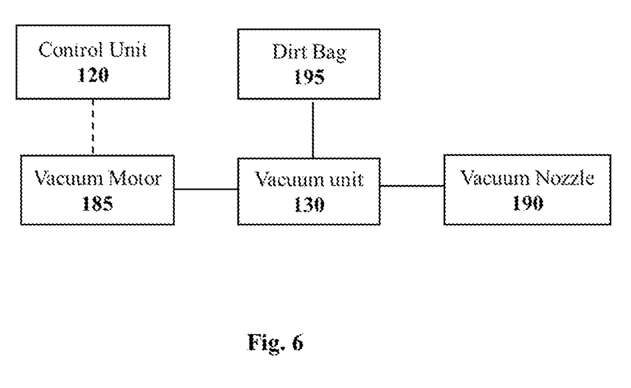
FIG. 6 is a block diagram showing different components of a vacuum unit, in accordance with an embodiment of the present invention.

FIG. 6 shows an embodiment of the vacuum unit 130 having a vacuum motor 185, a vacuum nozzle 190 and a dirtbag 195. The vacuum motor 185 is shown connected with the control unit 120 for controlling the function of the vacuum motor 185. The vacuum unit 130 functions to clean the surface by sucking the dirt. The method of vacuum cleaning using vacuum for sucking dirt is known to a skilled person. The vacuum motor 185 produces a vacuum that sucks air from the nozzle 190 into the dirtbag 195, wherein the dirt gets collected in the dirtbag 195. The nozzle 190 faces the surface to be cleaned. In the present embodiment, the nozzle is configured in the base of the body 105 and points the surface over which the compact robotic device 100 moves. An embodiment of nozzle 190 is shown in FIG. 3 showing the nozzle 190 configured in the base of the body 105 and facing downwards.

Figure 7:
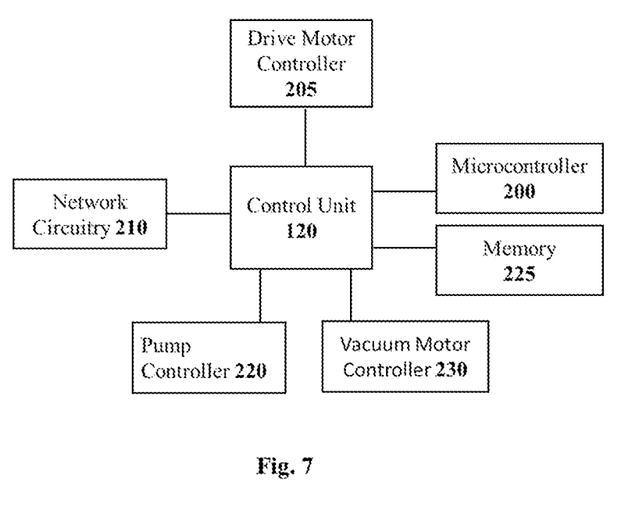
FIG. 7 is a block diagram showing different components of a control unit, in accordance with an embodiment of the present invention.
Figure 8:
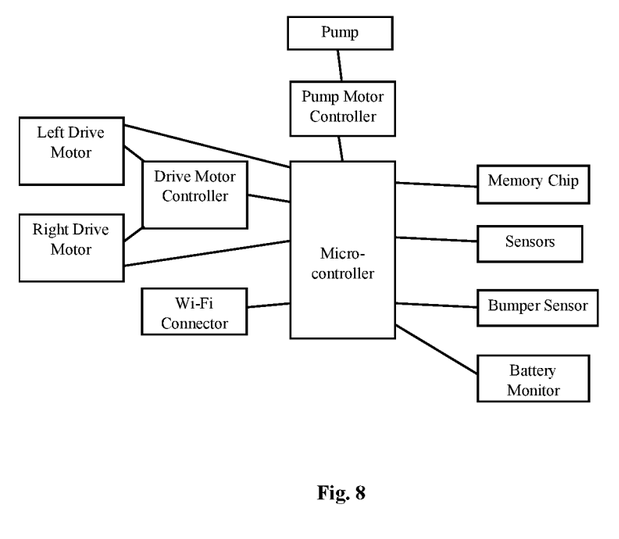
FIG. 8 is a block diagram showing a microcontroller in communication with different components of the compact robotic device, in accordance with an embodiment of the present invention.

FIG. 7 shows an embodiment of the control unit 120 having a microcontroller 200, drive motor controller 205, network circuitry 210, memory 225, and vacuum motor controller 230. The control unit 120 is designed to control the different components of the compact robotic device 100. Moreover, the control unit 120 is designed to perform, to control or to implement the steps of operating the compact computing device 100 for spraying powder to a designated area and vacuum cleaning. The microcontroller 200 is the main controller and functions to control the other components of the control unit 120. The drive motor controller 205 controls the functions of the electric motor 165. The network circuitry 210 encompasses network capabilities to the compact robotic device 100, such as Wi-Fi and Bluetooth. The pump controller 220 controls the functions of the pump 155 to start, increase or decrease the flow of powder from the cartridge 145 to the spray head 150. The memory 225 stores the program code, setting and floor plan, etc. The vacuum motor controller 230 function to control the operation of the vacuum motor 185. FIG. 8 shows the microcontroller 200 connected to different components for controlling one or more functions of the components.

In one embodiment, the compact robotic device 100 can be controlled through a computing device. Shown in FIG. 9 is the compact robotic device 100 in electronic communication with the computing device 245 through a wireless network 240. The wireless network 240 can be Bluetooth, Wi-Fi or any other network obvious to a skilled person for electronically pairing two electronic devices. The computing device 245 can be general-purpose personal computers (including, merely by way of example, personal computers and/or laptop computers running a standard operating system), cell phones or PDAs (running mobile software and being the Internet, e-mail, SMS, Blackberry, or other communication protocol enabled). The computing device may also have any of a variety of applications, including one or more operating systems and Web browser applications. A software application for communicating and controlling the compact robotic device 100 can be installed in the computing device 245. For example, the software application can be developed in the form of an app that can be made available for download on the play store. The app can be developed for the different operating systems, for example, Android, iOS, Windows, etc. In one case a user installs the app on his smartphone. The user is presented with an interface which shows different options for pairing and controlling the compact robotic device 100.

The compact robotic device 100 can travel according to the set floor plan. The compact robotic device 100 initially can help in preparing the floor plan by mapping the floor through one or more sensors. For example, the compact robotic device 100 can travel in an area to be cleaned until it hits an object. Then the robot can change its direction of travel and drive again until it hits another object. The movement of the robotic device can be mapped to create a floor plan. Moreover, the area to be treated with a biocide can also be set, for example, the compact robotic device 100 can be programmed to spray the powder over a carpet area. Alternatively, the compact robotic device 100 can detect the presence of a carpet while traveling and apply the powder. In one case, the carpet area is above the floor surface causing uneven surface and the compact robotic device can be configured to climb the carpet. In doing so, the compact robotic device can detect the presence of a carpet. Alternatively, the sensors can be disposed to detect the surface over which the compact robotic device 100 is traveling.

In one embodiment, the compact robotic device can be maneuvered through the sensors 130. For example, obstacle sensors, cliff sensors, wall sensors, wheel sensor and like can be used for navigation of the compact robotic device 100. In a preferred embodiment, the compact robotic device 100 can be equipped with a self-navigation system based on mapping technology. In one case, the compact robotic device is armed with digital cameras to take pictures of the walls, ceilings, doorways, furniture, and other pointers. In another case, a laser range finder (LIDAR, Light detection and ranging) that measure the distance to objects in the path of the compact robotic device 100 can be deployed in the compact robotic device 100. In both cases, data collected in combination with the information from the sensors is used to gradually build a map or a floor plan. The floor plan can be used to set the area to be treated with the biocide powder.

In one embodiment, shock-absorbing bumpers can be mounted on sides of the compact robotic device 100. The shock-absorbing bumpers can protect the compact robotic device 100 from any impact with an obstacle. The sensors can be located on or near the shock-absorbing bumpers to steer the compact robotic device 100 around the obstacles.

In one embodiment the compact robotic device can also be armed with one or more brushes 140. The brushes 140 pick up the dirt and direct it towards the powerful vacuum, which sucks it away. The brushes 140 can be spin by a motor housed in the body of the compact robotic device 100. The spinning brushes dislodge the dirt and direct it towards the vacuum. The brushes can be divided into side brushes and a brush roller. The coordinated function of the brushes 140 efficiently dislodges the dirt and direct it towards the vacuum. For example, the two side brushes can have a vertical axis of rotation and can preferably be rotated in opposite directions. The brush roller can have a vertical axis of rotation and positioned near the mouth of the vacuum unit. FIG. 3 shows an embodiment of the brush roller 140. The brush roller can be rotated to direct the dirt towards the vacuum.

Figure 10:
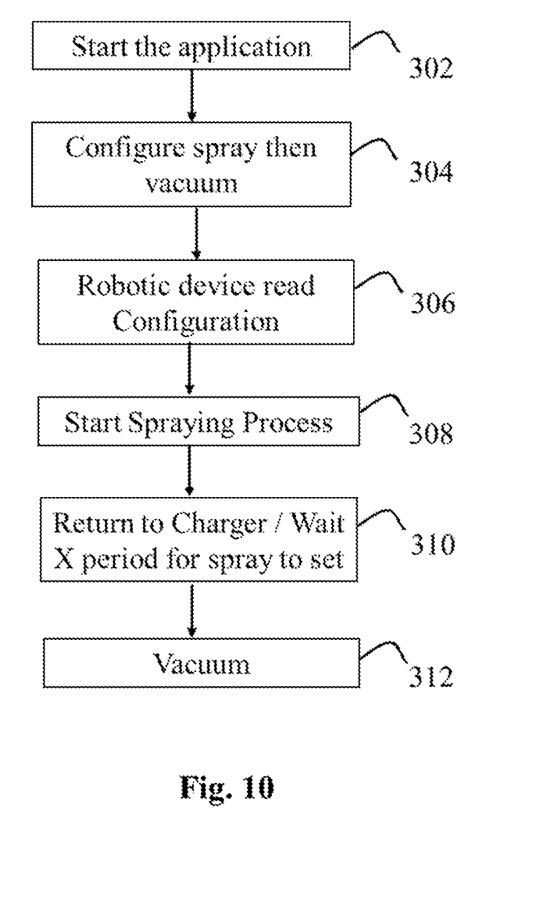
FIG. 10 is a flow chart showing a method, in accordance with an embodiment of the present invention.

FIG. 10 shows a method of operating the compact robotic device 100 wherein a user program the compact robotic device 100 to perform its one or more functions. At step 302, the user can start the application on his smartphone or other computing devices. Thereafter, the user can program the compact robotic device 100 to first spray and then clean the set area. The compact robotic device 100, at step 306, reads the configuration set by the user. The compact robotic device 100 thereafter starts the spraying process, at step 308. On completion of the spraying of the powder over the set surface, the compact robotic device 100, at step 310, moves to the charging dock for charging of the battery. The compact robotic device 100 rests at the charging dock for a predetermined X period during which the powder may get settled. After the X period, the compact robotic device 100 starts the vacuum cleaning.

Figure 11:
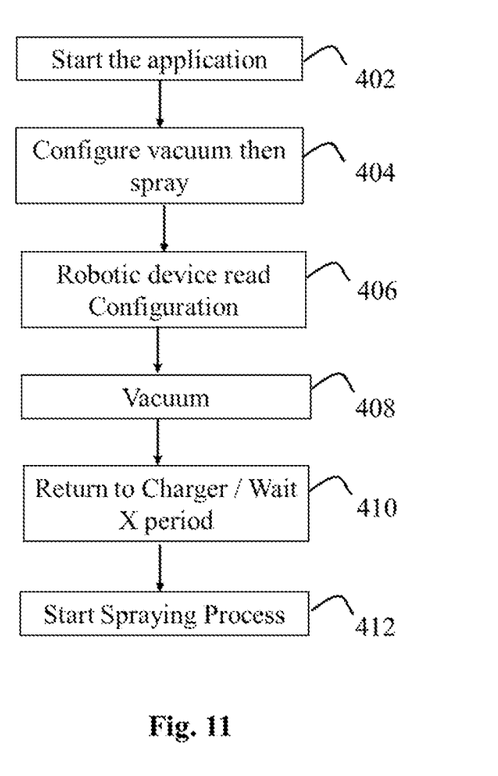
FIG. 11 is a flow chart showing a method, in accordance with an alternate embodiment of the present invention.

FIG. 11 shows another method of operating the compact robotic device 100 wherein a user program the compact robotic device 100 to perform one or more functions. At step 402, a user can start the application on his smartphone or other computing devices. Thereafter, the user can program the compact robotic device 100 to first vacuum-clean and then spray the powder over a set area. The compact robotic device 100, at step 406, reads the configuration set by the user. The compact robotic device 100 thereafter starts the vacuum cleaning, at step 408. On completion of the cleaning, the compact robotic device 100, at step 410, moves to the charging dock for charging of the battery. After charging for X period, the compact robotic device 100 starts the spraying of the powder to the set area.

Figure 12:
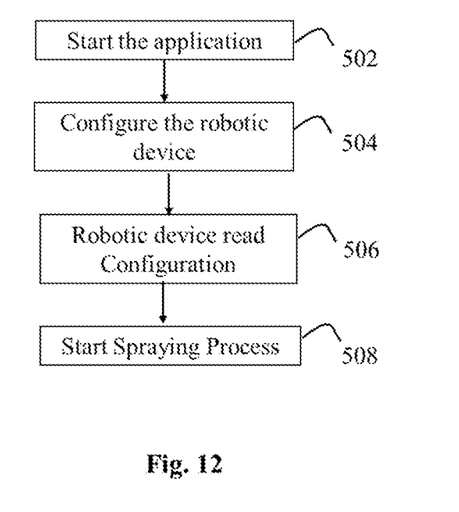
FIG. 12 is a flow chart showing a method, in accordance with an alternate embodiment of the present invention.

FIG. 12 shows another method of operating the compact robotic device 100 wherein a user program the compact robotic device 100 to perform one or more functions. At step 502, a user can start the application on his smartphone or other computing devices. Thereafter, the user can program the compact robotic device 100 to spray the powder over a set area. The compact robotic device 100, at step 506, reads the configuration and area set by the user. The compact robotic device 100 thereafter starts the spraying of the powder over the set area, at step 508.

Figure 13:
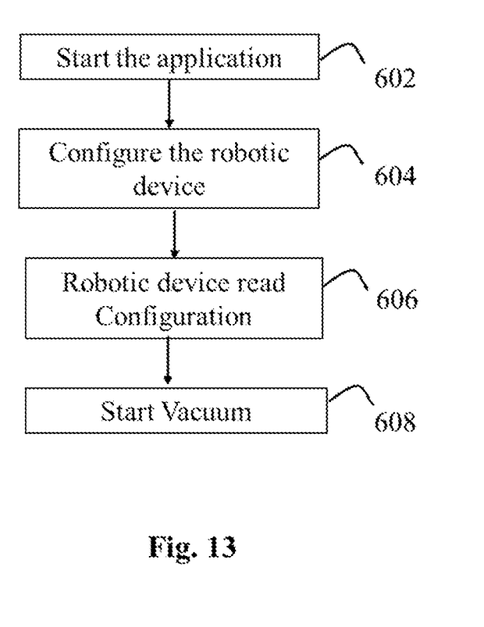
FIG. 13 is a flow chart showing a method, in accordance with an alternate embodiment of the present invention.

FIG. 13 shows another method of operating the compact robotic device 100 wherein a user program the compact robotic device 100 to perform one or more functions. At step 602, a user can start the application on his smartphone or other computing devices. Thereafter, the user can program the compact robotic device 100 to vacuum clean a set area, at step 604. The compact robotic device 100, at step 606, reads the configuration and area set by the user. The compact robotic device 100 thereafter starts vacuum cleaning of the set area, at step 608.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A robotic device for autonomous spraying a biocide to a surface, the robotic device comprising:
    a body;
    a cartridge configured to be removably docked onto the body and containing a biocide to be sprayed;
    a spray head in fluid communication with the cartridge, the spray head housed within the body, the spray head comprises a plurality of nozzles;
    a pump coupled to the cartridge and housed within the body, the pump configured to affect a flow of the biocide from the cartridge to the spray head;
    a control unit housed in the body and coupled to the pump, wherein the control unit is configured to control a function of the pump; and
    a cartridge reader housed in the body and configured to detect docking of the cartridge onto the body and amount of the biocide contained in the cartridge, the cartridge reader coupled to the controlling unit.

2. The robotic device of claim 1, wherein the biocide is in powder form and the pump is configured for spraying powder.

3. The robotic device of claim 1, wherein the biocide is in liquid form and the pump is configured for pumping liquid.

4. The robotic device of claim 1, wherein the robotic device further comprises a drive unit housed within the body and configured to self-propel the robotic device, the drive unit comprises a left wheel, a right wheel, and an electric motor coupled to the left wheel and the right wheel, the electric motor in electrical communication with the control unit.

5. The robotic device of claim 1, wherein the robotic device further comprises a drive unit housed within the body and configured to self-propel the robotic device, the drive unit comprises a left wheel, a right wheel, a left electric motor coupled to the left wheel, and a right electric motor coupled to the right wheel, the left electric motor and the right electric motor in electrical communication with the control unit.

6. The robotic device of claim 1, wherein the control unit further comprises a network circuitry for wirelessly coupling to a smartphone.

7. The robotic device of claim 1, wherein the robotic device further comprises a vacuum unit housed within the body, the vacuum unit configured to suck dirt.

8. The robotic device of claim 7, wherein the vacuum unit comprises a vacuum motor for creating a vacuum, a vacuum nozzle opening to an area to be cleaned, and a dirtbag for collecting the dirt.

9. The robotic device of claim 1, wherein the robotic device further comprises a power unit for powering the robotic device.

10. The robotic device of claim 9, wherein the power unit comprises a battery, a charging circuitry for charging the battery, the charging circuitry configured to couple to an external charging dock for power, wherein the robotic device can autonomously dock to the charging dock.

11. The robotic device of claim 1, wherein the robotic device further comprises a plurality of sensors configured to map a floor for generating a floor plan and allowing the robotic device to navigate based to the floor plan.

12. The robotic device of claim 1, wherein the surface is a surface of a carpet.

13. A method of controlling infestation, the method comprises:
   providing a robotic device for spraying a powder biocide over an infested surface, the robotic device comprising:
      a body,
      a cartridge configured to be removably docked onto the body and containing the powder biocide to be sprayed,
      a spray head in fluid communication with the cartridge, the spray head housed within the body, the spray head comprises a plurality of nozzles configured to spray the powder biocide,
      a pump coupled to the cartridge and housed within the body, the pump configured to affect a flow of the powder biocide from the cartridge to the spray head,
      a cartridge reader housed in the body and configured to detect docking of the cartridge onto the body and amount of the biocide contained in the cartridge, the cartridge reader coupled to the controlling unit;
   spraying of the powder biocide, autonomously by the robotic device, over the infested surface; and
   upon spraying, after a pre-determined period, suctioning the powder biocide from the infested surface.

14. The method of claim 13, wherein the robotic device further comprises a vacuum motor, a vacuum nozzle and a dirtbag.

15. The method according to claim 13, wherein the infested surface is a surface of a carpet.

16. The method according to claim 15, wherein the method further comprises:
   setting an area of the carpet in the robotic device for spraying the powder biocide over the carpet.

17. The method according to claim 15, wherein the method further comprises:
   detecting, a presence of the carpet based on an elevation of the carpet above a floor and climbing upon the carpet.

18. The method according to claim 15, wherein the robotic device further comprises one or more sensors configured to detect the carpet.

19. A method of controlling infestation, the method comprises:
   providing an autonomous robotic device for spraying a biocide over an infested surface, the autonomous robotic device comprises:
      a body,
      a cartridge configured to be removably docked onto the body and contain the biocide to be sprayed,
      a spray head in fluid communication with the cartridge, the spray head housed in the body, the spray head comprises a plurality of nozzles,
      a pump coupled to the cartridge and housed in the body, the pump configured to affect a flow of the biocide from the cartridge to the spray head,
      a control unit housed in the body and operably coupled to the pump for controlling a function thereof, and
      a cartridge reader housed in the body and configured to detect docking of the cartridge onto the body and an amount of the biocide contained in the cartridge, the cartridge reader is coupled to the control unit; and
   spraying of the biocide over the infested surface.

* * * * *